(12) United States Patent
Bauer, Jr.

(10) Patent No.: US 8,882,281 B2
(45) Date of Patent: Nov. 11, 2014

(54) PERIPHERAL VISION SAFETY SYSTEM AND DEVICE

(75) Inventor: Donn A. Bauer, Jr., Enumclaw, WA (US)

(73) Assignee: Neuwaukum Industries Inc., Enumclaw, WA (US)

( * ) Notice: Subject to any disclaimer, the term of this patent is extended or adjusted under 35 U.S.C. 154(b) by 336 days.

(21) Appl. No.: 12/590,997

(22) Filed: Nov. 17, 2009

(65) Prior Publication Data

US 2010/0123961 A1 May 20, 2010

Related U.S. Application Data

(60) Provisional application No. 61/115,538, filed on Nov. 17, 2008.

(51) Int. Cl.
*G02B 7/182* (2006.01)
*G02B 7/00* (2006.01)
*A42B 3/04* (2006.01)

(52) U.S. Cl.
CPC .............. *G02B 7/002* (2013.01); *G02B 7/1824* (2013.01); *A42B 3/0426* (2013.01)
USPC .......................................... 359/879

(58) Field of Classification Search
CPC .......... A42B 3/0426; Y10S 2/08; B60R 1/12; B60R 1/06; B60R 1/072
USPC .................................... 359/879, 880
See application file for complete search history.

(56) References Cited

U.S. PATENT DOCUMENTS 3,988,058 A * 10/1976 Chaney et al. ................ 359/880
6,247,824 B1 * 6/2001 Berke et al. .................... 359/880

\* cited by examiner

*Primary Examiner* — Euncha Cherry
(74) *Attorney, Agent, or Firm* — Kyle H. Flindt; Adam L. K. Philipp; ÆON Law

(57) ABSTRACT

A peripheral vision safety system and device expands peripheral vision of an individual without impeding forward vision. The expanded zone of peripheral vision provides a new level of safety for flaggers and other construction site members by reducing the risk of injury or death from passing vehicles, heavy equipment, and other hazards not in their direct line of sight. A peripheral vision safety device includes a detachable mounting clip for removably securing it to the brim of a safety helmet or cap or other type of head covering. A peripheral vision safety device includes multiple adjustable couplings configured for optimal positioning of the reflector.

20 Claims, 12 Drawing Sheets

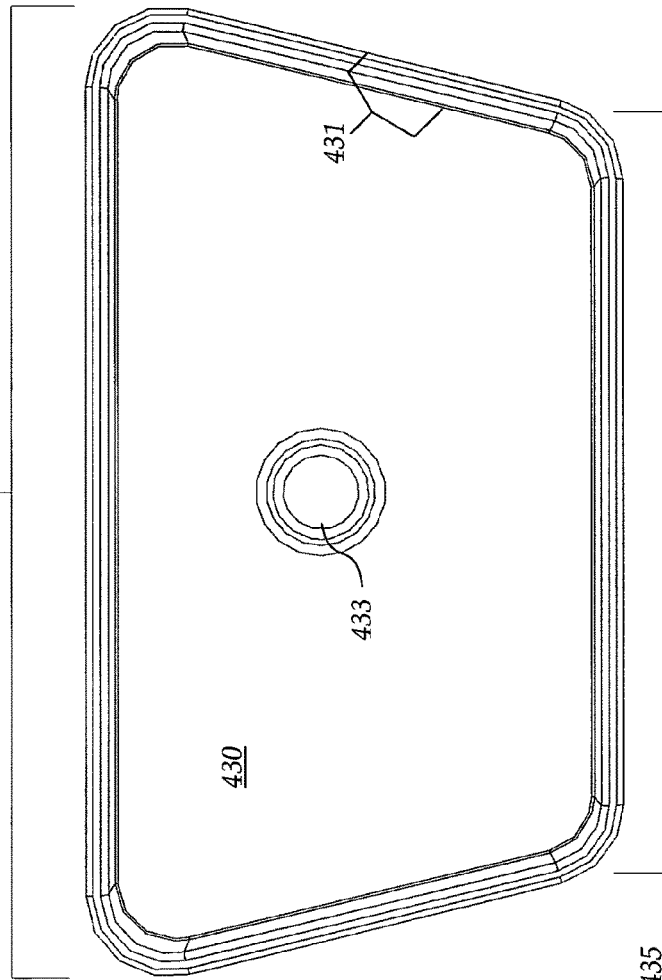
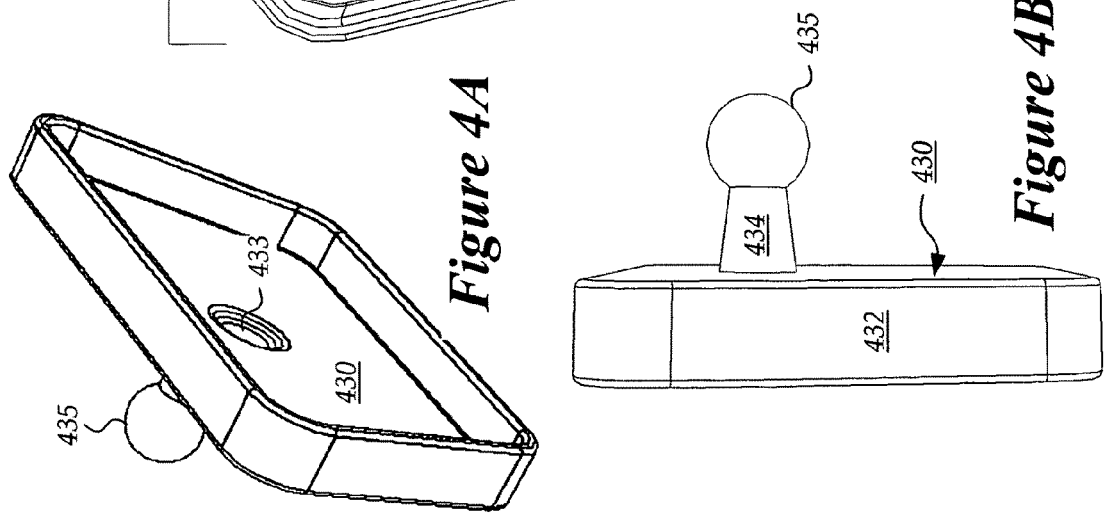
*Figure 4C*
*Figure 4A*
*Figure 4B*

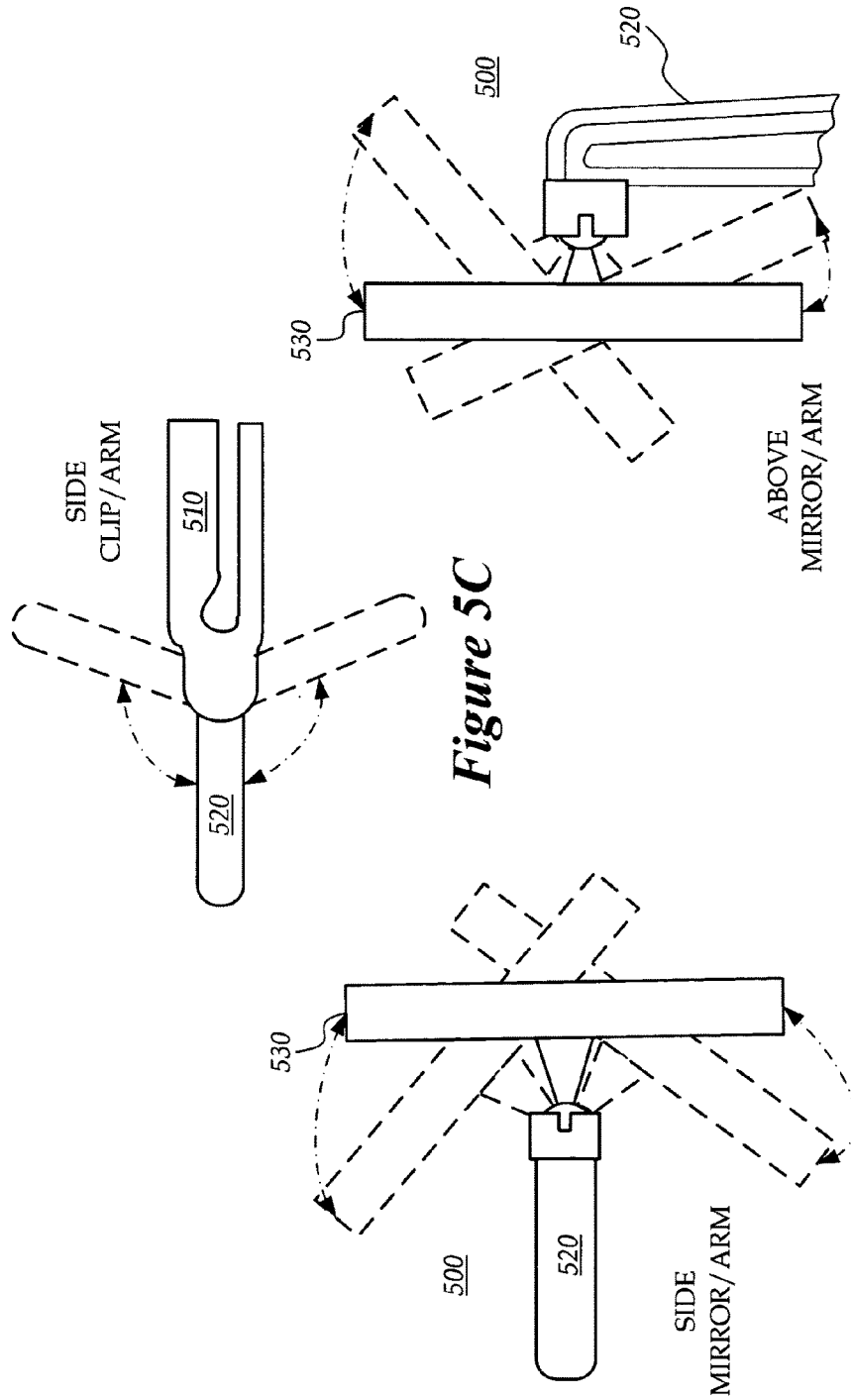

PERIPHERAL VISION SAFETY SYSTEM AND DEVICE

CROSS REFERENCE TO RELATED APPLICATIONS

The present application is a non-provisional application that claims priority and incorporates by reference in its entirety provisional U.S. patent application Ser. No. 61/115,538, entitled "Rear View Safety Device" filed on Nov. 17, 2008.

TECHNICAL FIELD

Embodiments of the present disclosure generally relate to various forms of vision enhancement safety devices. More particularly, the embodiments of the present disclosure relate to safety systems and devices to improve peripheral vision.

BACKGROUND

Reflective safety devices have been used to provide a rear view for driving, cycling, and other activities where turning the head to obtain a view is either unsafe or difficult due to circumstances. Often the individual needing the enhanced vision moves comparatively little, but is surrounded by a working environment with a number of dangerous moving objects or the individual simply needs to have a better perspective of their surroundings. Examples of these individuals include motorcyclists, safety flaggers, factory or plant employees, traffic police, construction site workers, firefighters, forklift and other equipment operators, hunters, joggers, cyclists and other athletes.

Existing reflective devices may only provide limited vision enhancement, while introducing cumbersome extensions that may actually present addition safety hazards to the individual. These extensions are often attached to a clothing article, such as a hat or other form of headgear and often prevent use of the clothing article for other activities. Additionally, some existing reflective devices actually extend into the path of traffic may be clipped or knocked by a passing vehicle and thereby knock anything attached to the device, which at best might knock off the hat or glasses, but at worst could potentially twist the head of the wearer. The potential risk of injury is often exacerbated when the respective reflective device is irremovably attached.

SUMMARY

It is accordingly an object of the disclosure to provide a peripheral vision safety device that overcomes the hereinafore-mentioned disadvantages of the heretofore-known mechanisms of the general type currently employed in the safety gear industry. The described apparatus, methods and systems of reflective safety gear expand the zone of vision for individuals. More specifically, embodiments of the disclosure are configured to expand and clarify peripheral vision and reduce the individual's risk of injury or death from passing vehicles, heavy equipment and other hazards not in their direct line of sight.

More particularly, a peripheral vision device having a clamp configured to couple the device to a safety helmet and an adjustable reflective device repositionable to extend the peripheral vision of the individual wearing the safety helmet. An adjustable arm of the peripheral vision device being coupled between the clamp and the reflective device to place the reflective device into a visible location below the brim of the safety helmet. In accordance with an additional mode of the disclosure, the coupling between the arm and the clamp utilizes a hinge having dual circular connectors, each connector having at least one side exhibiting radial triangular corrugation. In accordance with yet another mode of the disclosure, the clamp includes lever to fixable position and/or secure the peripheral vision device on the safety helmet. In accordance with a further mode of the disclosure, the peripheral vision safety device includes a bead receiver on the clamp to secure the position of the peripheral vision safety device on the safety helmet.

With the foregoing and other objects in view, there is provided, in accordance with the disclosure, a safety threshold breakaway method that initially holds the peripheral vision safety device to a safety helmet, but upon impact or inappropriate application of torque allows portions of the device to breakaway or separate in an effort to alleviate the relative force of the impact of the contact to the wearer of the safety helmet.

In accordance with a further mode of the disclosure, the peripheral vision safety system allows the devices to be stored in the safety helmet to help ensure their use.

Other features that are considered as characteristic for the disclosure are set forth in the appended claims.

Although the disclosure is illustrated and described herein as embodied in apparatus, methods, and systems for expanding peripheral vision, it is, nevertheless, not intended to be limited to the details shown because various modifications and structural changes may be made therein without departing from the spirit of the disclosure and are within the scope and range of equivalents of the claims.

The construction and method of operation of various embodiments in the disclosure, however, together with additional objects and advantages thereof, will be best understood from the following description of specific embodiments when read in connection with the accompanying drawings and claims.

BRIEF DESCRIPTION OF THE DRAWINGS

Non-limiting and non-exhaustive exemplary embodiments of the present disclosure are described with reference to the following drawings in which:

FIG. 4A is a perspective view in elevation showing a reflective surface holder component of the peripheral vision safety device of FIG. 1 in accordance with various embodiments of the present disclosure;

FIG. 4B is a side view of the reflective surface holder component of the peripheral vision safety device of FIG. 1;

FIG. 4C is a front view of the reflective surface holder component of the peripheral vision safety device of FIG. 1;

FIG. 5A is a side view of a portion of an adjustment flexibility safety system in accordance with various embodiments of the present disclosure;

FIG. 5B is a top view of a portion of an adjustment flexibility safety system in accordance with various embodiments of the present disclosure;

FIG. 5C is a side view of another portion of the adjustment flexibility safety system in accordance with various embodiments of the present disclosure;

DETAILED DESCRIPTION

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Figure 10:
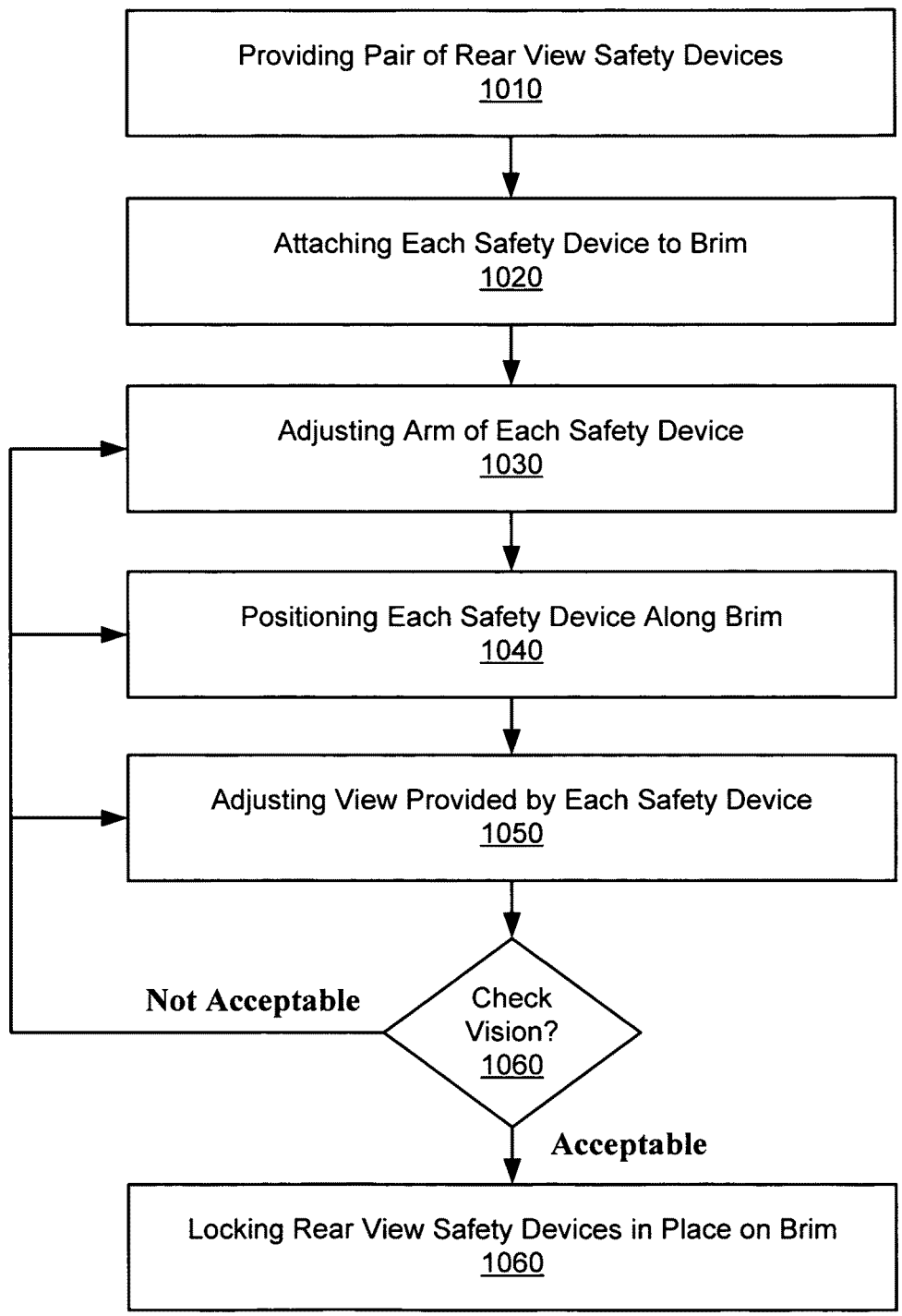
FIG. 10 is a flow diagram view of a portion of a method of operation for adjustment of a peripheral vision safety system in accordance with various embodiments of the present disclosure.

Various operations may be described as multiple discrete operations in turn, in a manner that may be helpful in understanding embodiments of the present disclosure; however, the order of description should not be construed to imply that these operations are order dependent (see e.g., description of the safety vision adjustment system associated with steps 1030, 1040, and 1050 in FIG. 10).

Reference in the specification to "one embodiment" or "an embodiment" means that a particular feature, structure, or characteristic described in connection with the embodiment is included in at least one embodiment of the disclosure. The appearances of the phrase "one embodiment" or "an embodiment" in various places in the specification do not necessarily all refer to the same embodiment; however, they may. The terms "comprising", "having", and "including" should be considered synonymous, unless context dictates otherwise. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional. The use of any of these phrases does not imply or indicate that the particular feature, structure, or characteristic being described is a necessary component for every embodiment for which such a description is included.

The terms "hat", "helmet", and "cap" should be considered synonymous, unless context dictates otherwise. In various descriptions the terms generally indicate a headcovering that may include different portions including a crown/shell, a brim, a bill/peak, and/or a sweatband or hatband. The crown or shell may designate the portion of the headcovering covering the top of the head. The brim may designate a projection of stiff material from the bottom of the crown extending substantially horizontally all around the circumference of the headcovering. The peak or bill may designate a stiff projection at the front of the headcovering configured to shade or shield the eyes from, among other things, debris, sunlight, and/or rain. The sweatband or hatband may designate a ribbon or band that runs around the bottom edge of the hat or a suspension system that spreads the headcovering weight over the top of the head and provides spacing between the headcovering's shell and the head lessening the blow to the individual's head if an object strikes the headcovering. In various embodiments the suspension system provides a safety distance cushion of approximately 3 cm between the shell and the headcovering. In various embodiments, the sweatband may also be adjustable and/or include a chinstrap to affix the headcovering more securely to the head of the individual. In one embodiment, a headcovering, as described herein, is the same as protective gear worn on the head to protect from injury, such as a hard hat, helmet, or headgear. Protective headcoverings are predominantly used in workplace environments, such as construction sites, to protect the head from injury by falling objects, debris, bad weather, and electric shock.

Figure 1:
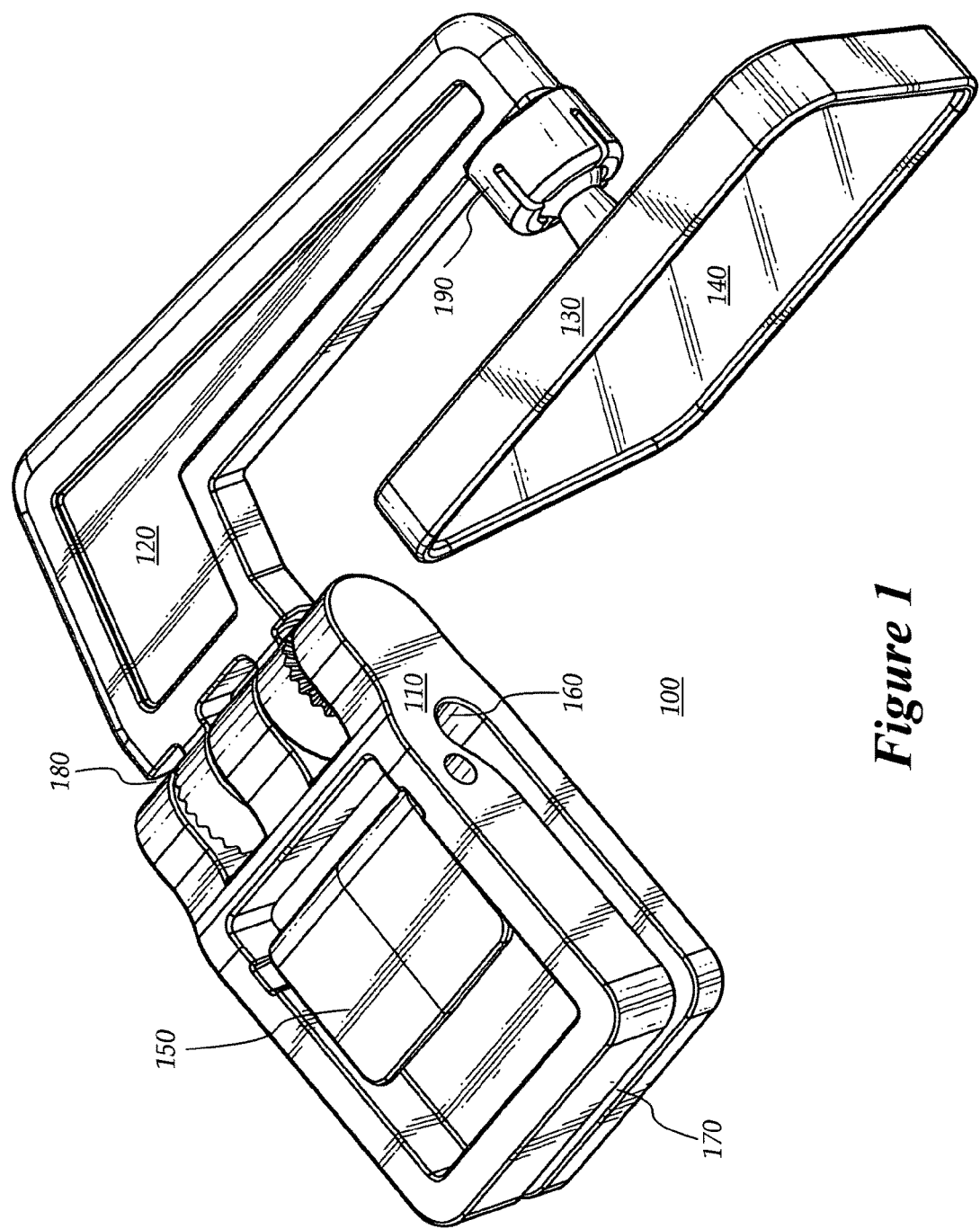
FIG. 1 is a perspective view in elevation showing a peripheral vision safety device in accordance with various embodiments of the present disclosure.

Referring now to FIG. 1, a perspective view in elevation showing a rear view safety device 100 is shown in accordance with various embodiments of the present disclosure. Rear view safety device 100 supplements peripheral vision without hindering direct forward vision. The illustrated embodiment of the rear view safety device 100 includes a clip 110 to attach to a bill or brim of a headcovering, an arm 120 for adjusting height, and an adjustable mounting bracket 130 for securely holding a reflective surface 140.

In the illustrated embodiment, the mirror and/or reflective surface 140 includes a generally planar protective surface, which may either directly exhibit reflective properties or be combined with at least one underlying reflective layer. For example, in one embodiment the reflective surface 140 includes a substantially transparent substrate layer of material and a second reflective substrate layer including at least partially reflective material. In one embodiment, the reflective surface 140 when properly positioned and adjusted is configured to provide a field of view extending to the horizon from a line perpendicular to a longitudinal plane tangent to the individual's side, the field of view also extending out from the tangent plane and behind the eyes of the individual. Accordingly, depending on relative eye position of the individual to the rear view safety device 100, an additional segment of peripheral vision may be available to the individual. In one embodiment, the additional segment may include up to about 180° of peripheral vision. The reflective surface 140 may also be configured to enhance or enlarge images from behind.

In one embodiment, a compound mirror may be used to enlarge the field of view and eliminate potential blind zones near the individual wearing the rear view safety device 100. The compound mirror may include a secondary spherically convex reflective surface to view zones not directly visible in the primary reflective surface of the compound mirror.

The clip 110 includes a lever 150, notch 160, slot 170, and hinge joint 180. The lever 150 having at least an unlocked position and a locked position. The notch 160 configured to match and receive a bead/lip of the brim/bill of various headcoverings. The slot 170 running the width and most of the length of the clip 110. The slot 170 is configured to detachably secure to an edge of a headcovering. In one embodiment the clip 110 is able to attach to the edge of a headcovering through tension created by separating top and bottom portions of the clip 110. In addition, the clip 110 may be locked into place on the edge of the headcovering via the lever 150. In one embodiment, the lever 150 is substantially parallel to the slot 170 in the locked position and substantially perpendicular to the slot 170 in the unlocked position. In the locked position, the lever 150 butts against the bead of the headcovering in the notch 160. In the unlocked position, the clip may slide along the edge of the headcovering following the track provided by the bead of the headcovering. On hats without a bead on the edge, safari style hats, or other thin hats spacer pads may be added to the brim/bill of the hat so that the rear view safety device 100 may be attached. Once the spacer pads are properly positioned, the slot 170 of the unlocked clip 110 may slide into position before the lever 150 is moved into the locked position.

Hinge joint 180 forms an adjustable connection between the clip 110 and the arm 120. The hinge joint 180 includes at least one connector from the clip 110 and at least one connector from the arm 120 that, when connected, selectively secure a relative position of the clip 110 with respect to the arm 120. The arm 120 is also coupled to the adjustable mounting bracket 130 via swivel coupling 190 configured to allow adjustment of the reflective surface in a variety of directions. The swivel coupling 190 provides a releasable connection between the arm 120 and the adjustable mounting bracket 130. For example, the illustrated ball and socket joint may allow the ball of the adjustable mounting bracket 130 to pop out of the socket on the arm 120.

It will be appreciated by those of ordinary skill in the art and others, that a wide variety of alternate and/or equivalent implementations of couplings 190 and/or joints 180 may be substituted for the specific embodiment of connections as shown. For example, in an alternative embodiment the adjustable mounting bracket 130 may instead include a socket to couple with a ball of the arm 120. Alternatively, a joint with movement about the hinge axis similar to the illustrated hinge joint 180 may be combined to enable the mounting bracket to be adjusted in at least two directions. Moreover, a combination of joints/couplings may be employed to enable adjustment in a variety of directions.

Although the various embodiments are not described with reference to any particular material, it will be appreciated that a variety of materials may be used to implement the teachings of the embodiments as described herein.

Figure 2:
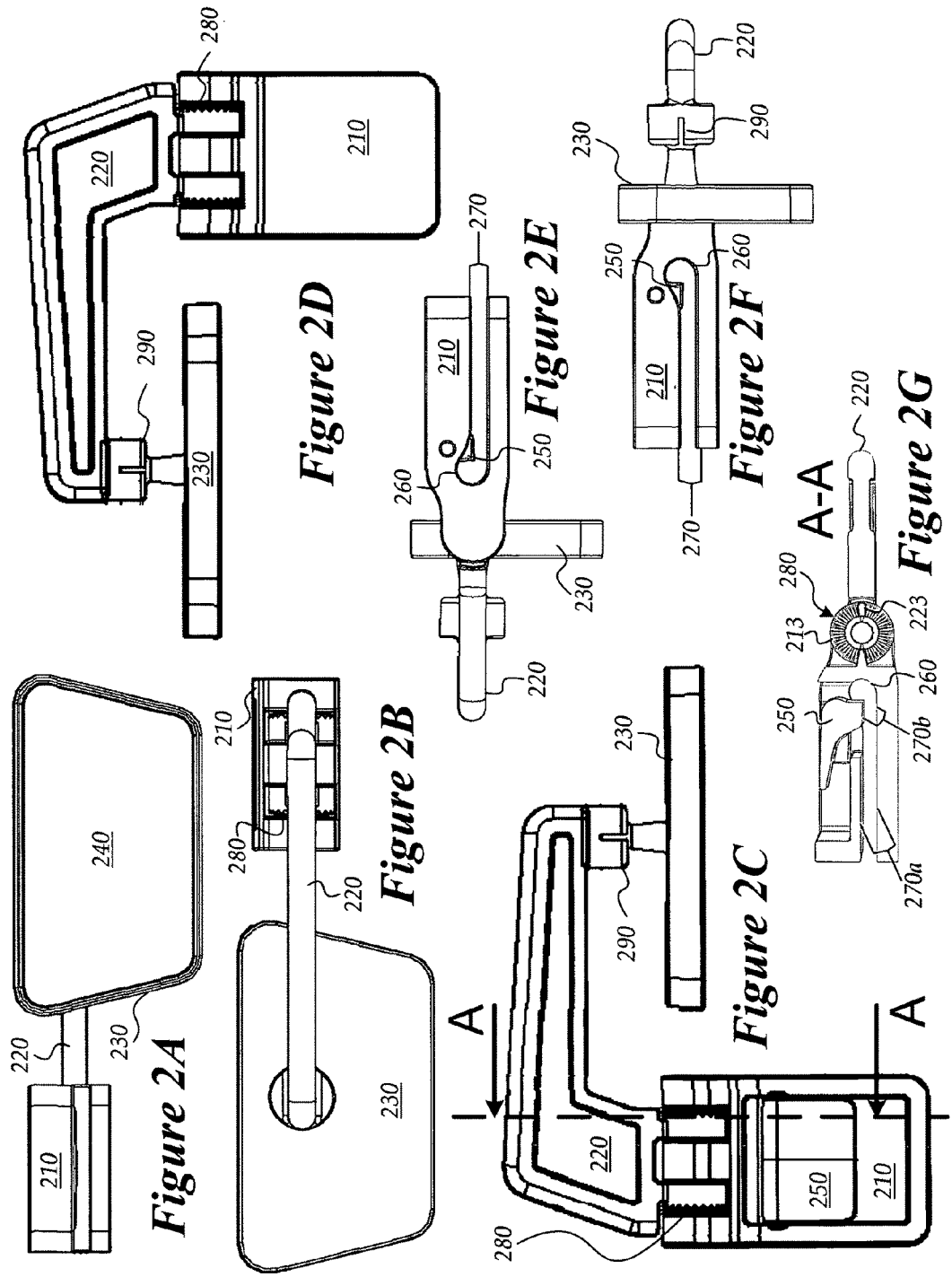
FIG. 2A is a front view showing the peripheral vision safety device of FIG. 1.
FIG. 2B is a back view showing the peripheral vision safety device of FIG. 1.
FIG. 2C is a top view showing the peripheral vision safety device of FIG. 1.
FIG. 2D is a bottom view showing the peripheral vision safety device of FIG. 1.
FIG. 2E is a left side view showing the peripheral vision safety device of FIG. 1.
FIG. 2F is a right view showing the peripheral vision safety device of FIG. 1.
FIG. 2G is a cross-section side view A-A through a portion of the peripheral vision safety device of FIG. 2C in accordance with various embodiments of the present disclosure.

Referring now to FIG. 2A, a front view showing the rear view safety device of FIG. 1 is shown in further detail.

Referring now to FIG. 2B, a back view showing the rear view safety device of FIG. 1 is shown in further detail.

Referring now to FIG. 2C, a top view showing the rear view safety device of FIG. 1 is shown in further detail.

Referring now to FIG. 2D, a bottom view showing the rear view safety device of FIG. 1 is shown in further detail.

Referring now to FIG. 2E, a left side view showing the rear view safety device of FIG. 1 is shown in further detail.

Referring now to FIG. 2F, a right view showing the rear view safety device of FIG. 1 is shown in further detail.

Referring now to FIG. 2G, a cross-section side view A-A through a portion of the rear view safety device of FIG. 2C is shown in further detail in accordance with various embodiments of the present disclosure.

Figure 3:
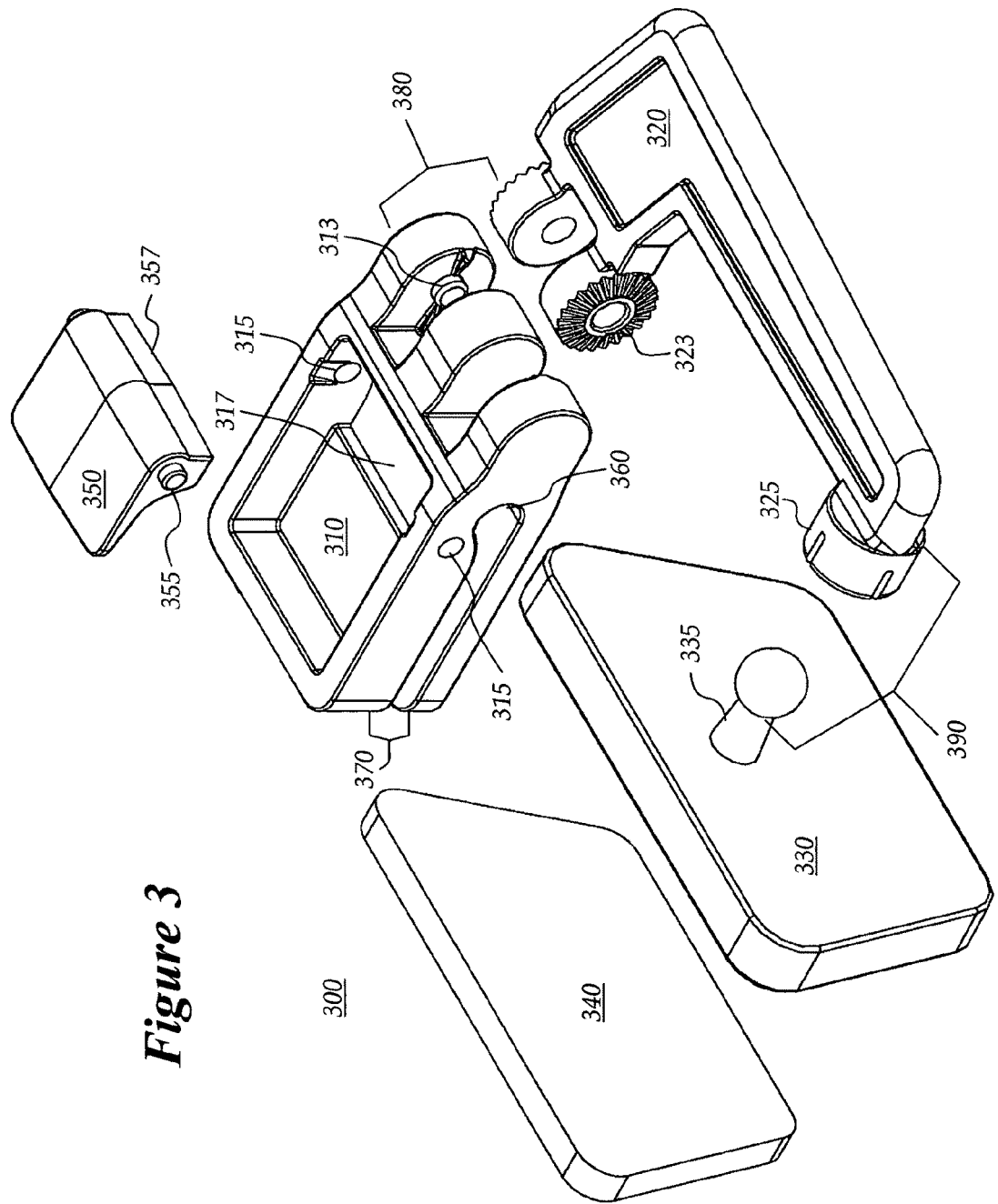
FIG. 3 is an exploded perspective view in elevation from behind showing components of the peripheral vision safety device of FIG. 1 in accordance with various embodiments of the present disclosure.

Referring now to FIG. 3, an exploded perspective view in elevation from behind showing components of the rear view safety device of FIG. 1 is shown in further detail in accordance with various embodiments of the present disclosure.

Referring now to FIG. 4A, a perspective view in elevation showing a reflective surface holder component of the rear view safety device of FIG. 1 is shown in further detail in accordance with various embodiments of the present disclosure.

Referring now to FIG. 4B, a side view of the reflective surface holder component of the rear view safety device of FIG. 1 is shown in further detail.

Referring now to FIG. 4C, a front view of the reflective surface holder component of the rear view safety device of FIG. 1 is shown in further detail.

Referring now to FIG. 5A, a side view of a portion of an adjustment flexibility safety system is shown in further detail in accordance with various embodiments of the present disclosure.

Referring now to FIG. 5B, a top view of a portion of an adjustment flexibility safety system is shown in further detail in accordance with various embodiments of the present disclosure.

Referring now to FIG. 5C, a side view of another portion of the adjustment flexibility safety system is shown in further detail in accordance with various embodiments of the present disclosure.

Figure 6:
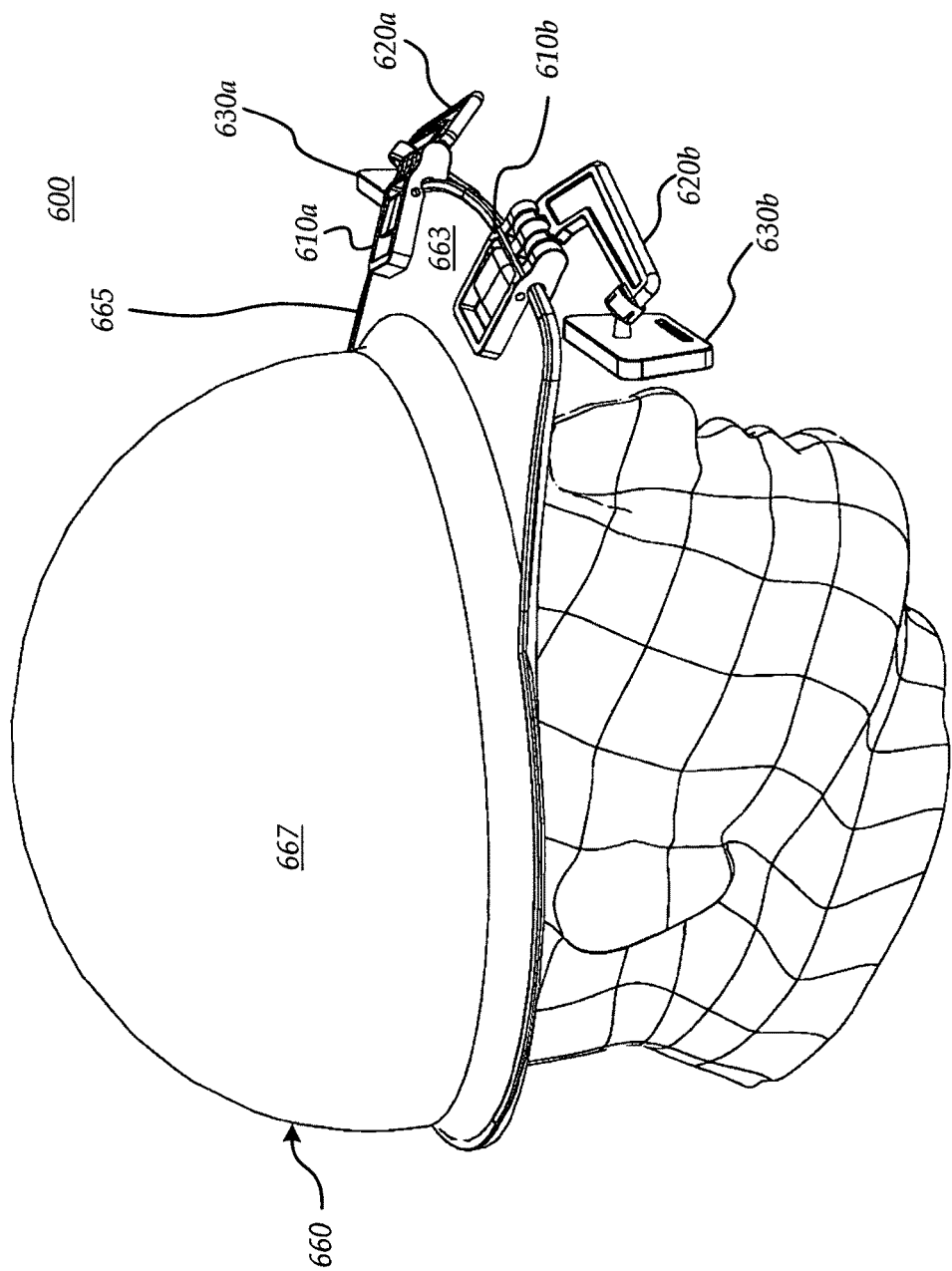
FIG. 6 is a perspective schematic view of a portion of a peripheral vision safety system employing a protective head covering and a matched pair of the peripheral vision safety devices of FIG. 1 in accordance with various embodiments of the present disclosure.

Referring now to FIG. 6, a perspective schematic view of a portion of a rear view safety system employing a protective head covering and a matched pair of the rear view safety devices of FIG. 1 is shown in further detail in accordance with various embodiments of the present disclosure.

Figure 7:
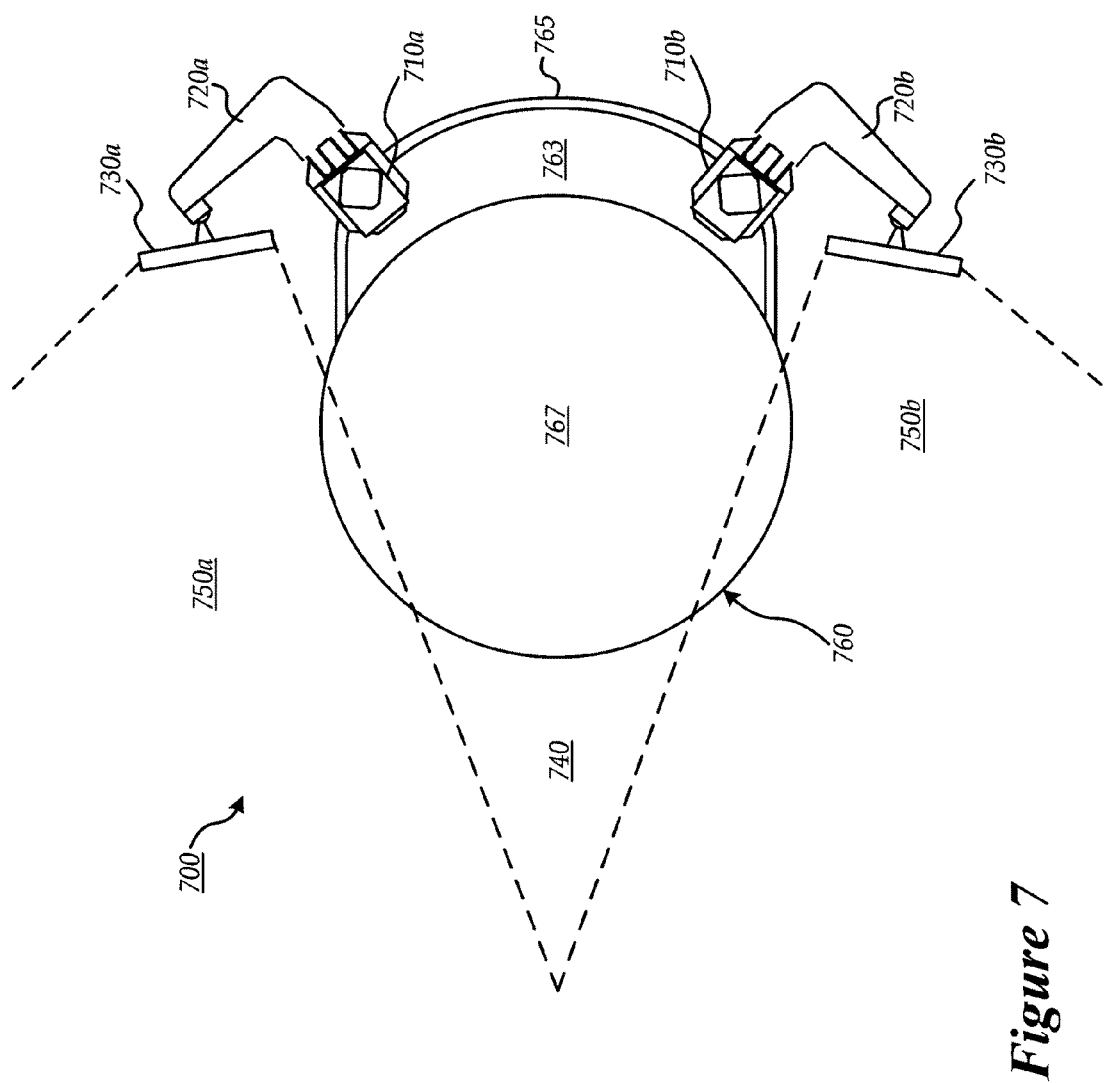
FIG. 7 is a top view of a portion of a peripheral vision safety system of FIG. 6 illustrating potential sight lines in accordance with various embodiments of the present disclosure.

Referring now to FIG. 7, a top view of a portion of a rear view safety system of FIG. 6 is shown in further detail illustrating potential sight lines in accordance with various embodiments of the present disclosure.

Figure 8:
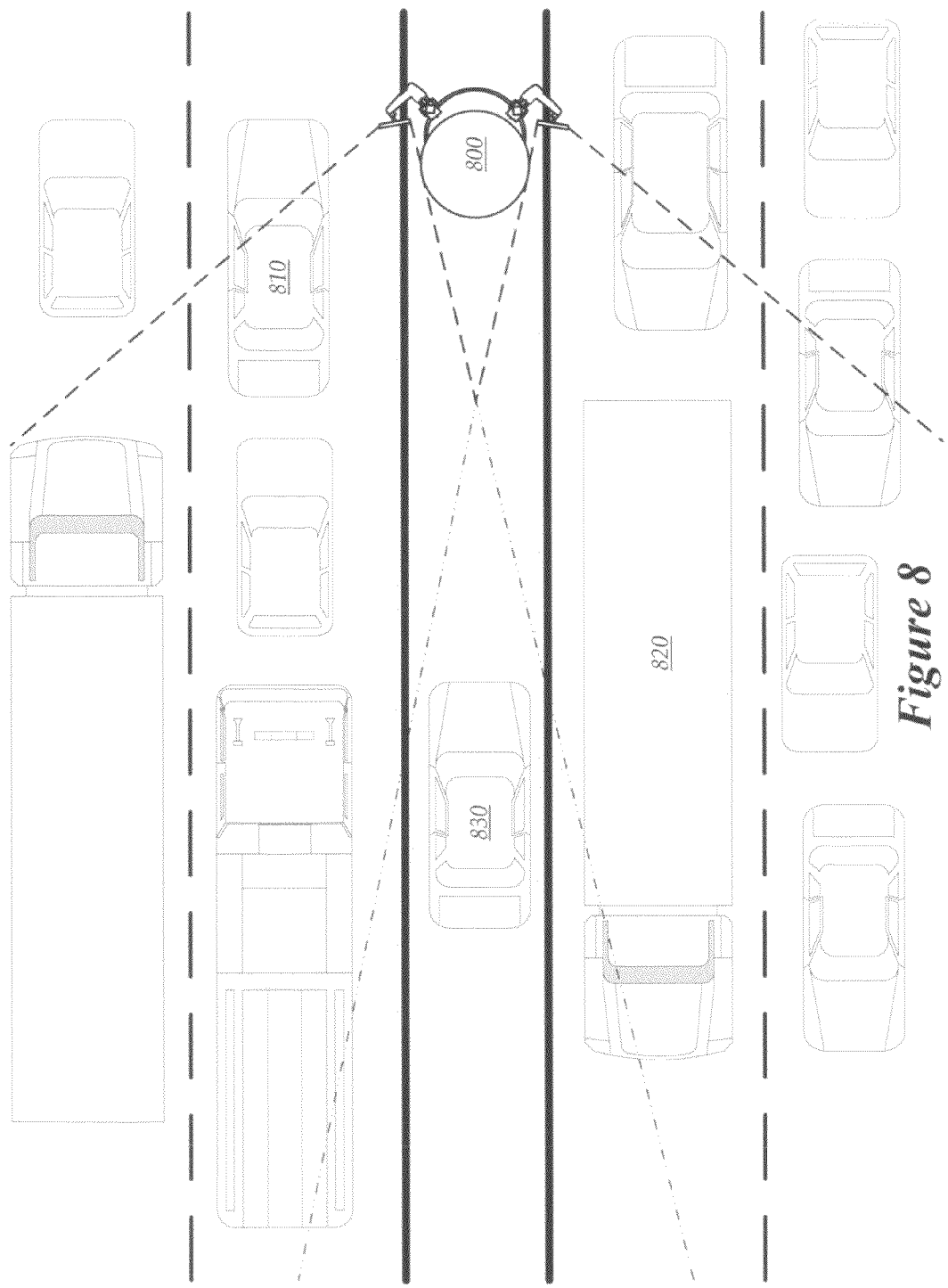
FIG. 8 is top schematic view of a portion of available pedestrian sight lines in a perilous traffic environment to an individual employing the peripheral vision safety system of FIG. 6 in accordance with various embodiments of the present disclosure.

Referring now to FIG. 8, a top schematic view of a portion of available pedestrian sight lines in a perilous traffic environment to an individual employing the rear view safety system of FIG. 6 is shown in further detail in accordance with various embodiments of the present disclosure.

Figure 9B:
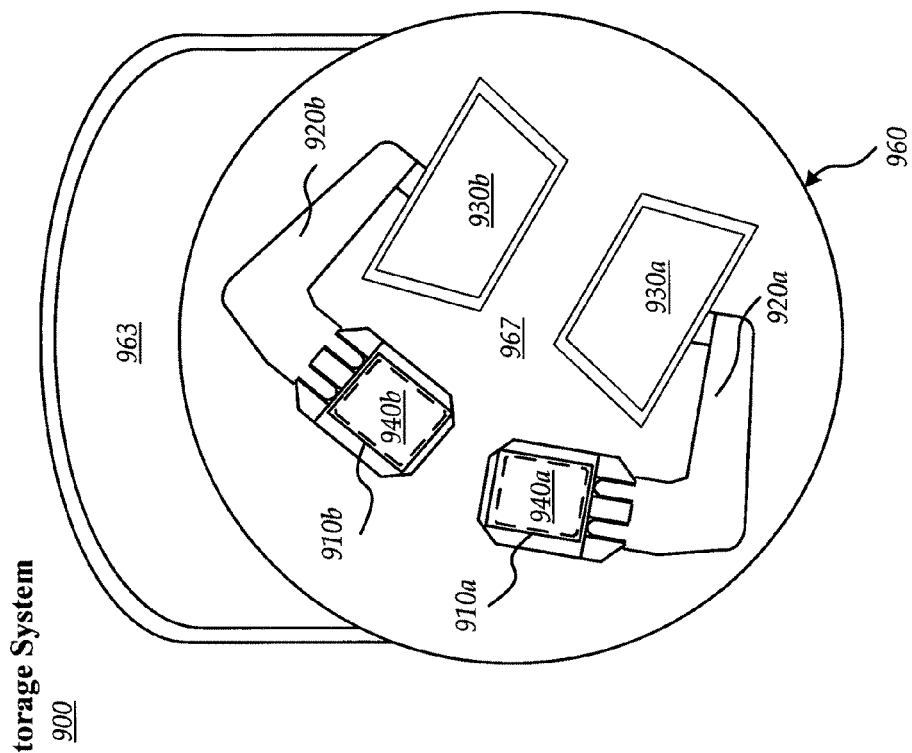
FIG. 9B is a top view of the inverted headcovering with the safety storage system of FIG. 9A securely storing multiple peripheral vision safety devices in accordance with various embodiments of the present disclosure.
Figure 9A:
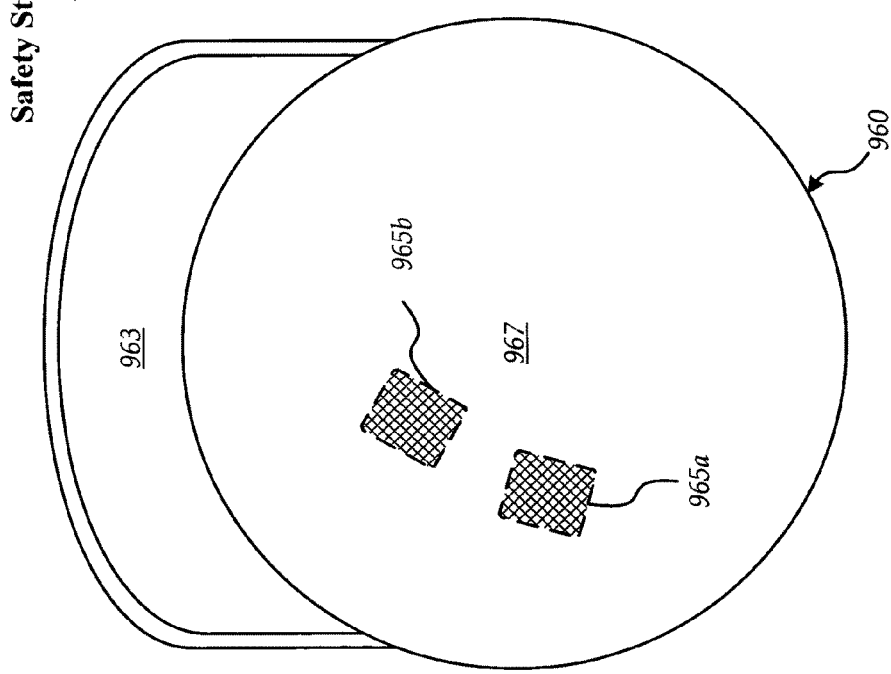
FIG. 9A is a top view of an inverted headcovering with a safety storage system in accordance with various embodiments of the present disclosure.

Referring now to FIG. 9A, a top view of an inverted headcovering 960 with a safety storage system 900 is shown in further detail in accordance with various embodiments of the present disclosure. The safety storage system 900 includes at least one attachment strip (965a and 965b) in the for each rear view safety device removably detaching First remove the backing paper from the large piece of loop Velcro and place the adhesive side down on the largest free space inside your hard hat (usually the rear middle).

Referring now to FIG. 9B, a top view of the inverted headcovering 960 with the safety storage system of FIG. 9A is shown in further detail securely storing multiple rear view safety devices in accordance with various embodiments of the present disclosure. In one embodiment, the peripheral vision system storage procedure include first, remove the backing paper from the large piece of loop Velcro and place the adhesive side down on the largest free space inside your hard hat (usually the rear middle). Next apply one piece of the hook Velcro to each safety device on the flat side of the clip. To avoid damage to your safety device while not in use please use the quick disconnect levers to remove the safety device from the rim of your hat fold the arms away from the Velcro and place inside the hat on the loop pad. Another feature of this system is that the wearer can't put on the hard hat without pulling out the safety device and if they are already out the individual might as well wear them. In one embodiment, the storage system consists of 1 large piece of loop Velcro for inside the hardhat and two 1 inch square pieces of hook Velcro to go on the peripheral vision safety device.

Figure 11:
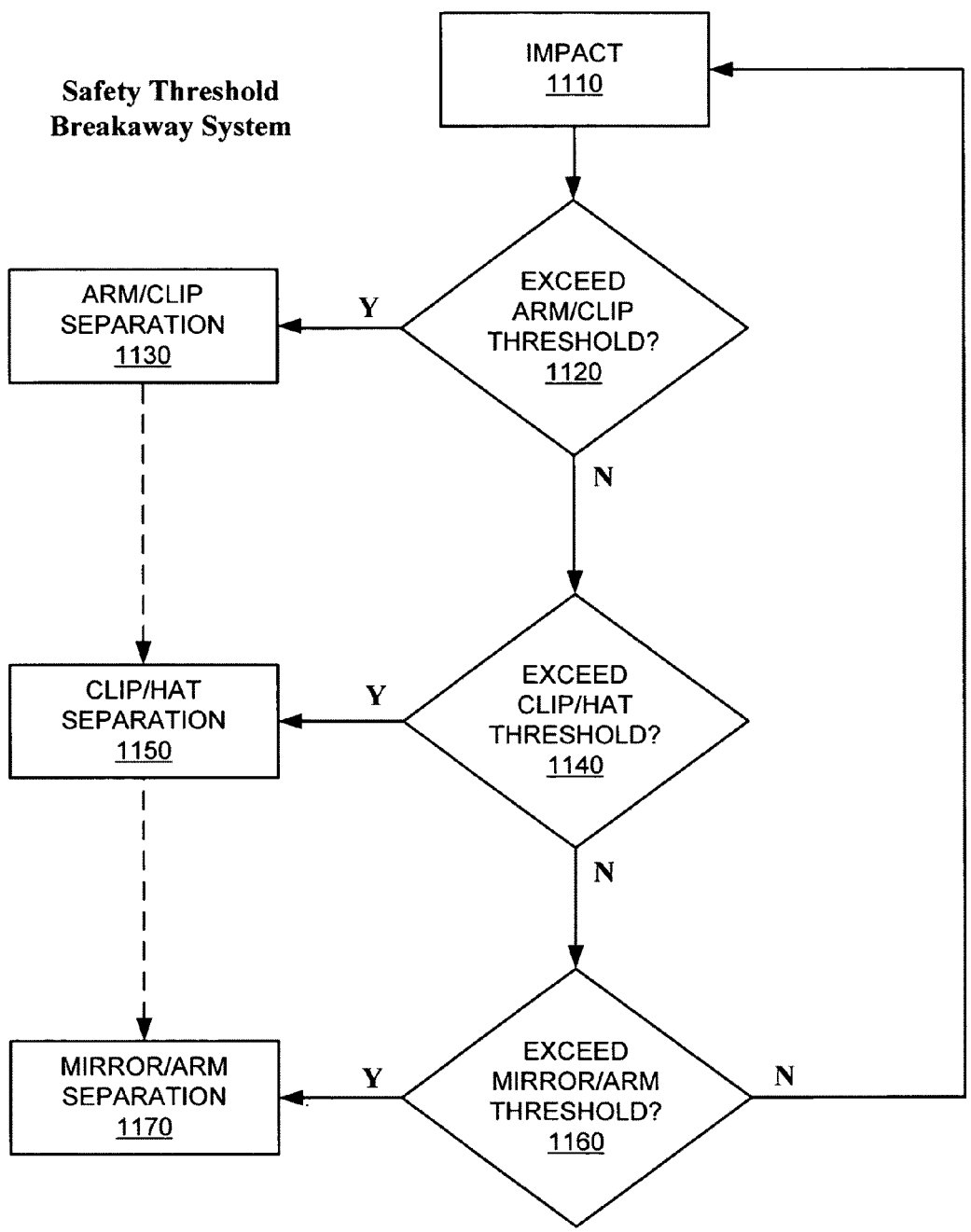
FIG. 11 is a flow diagram view of a portion of a method of operation for a peripheral vision safety system in accordance with various embodiments of the present disclosure.
Figure 12:
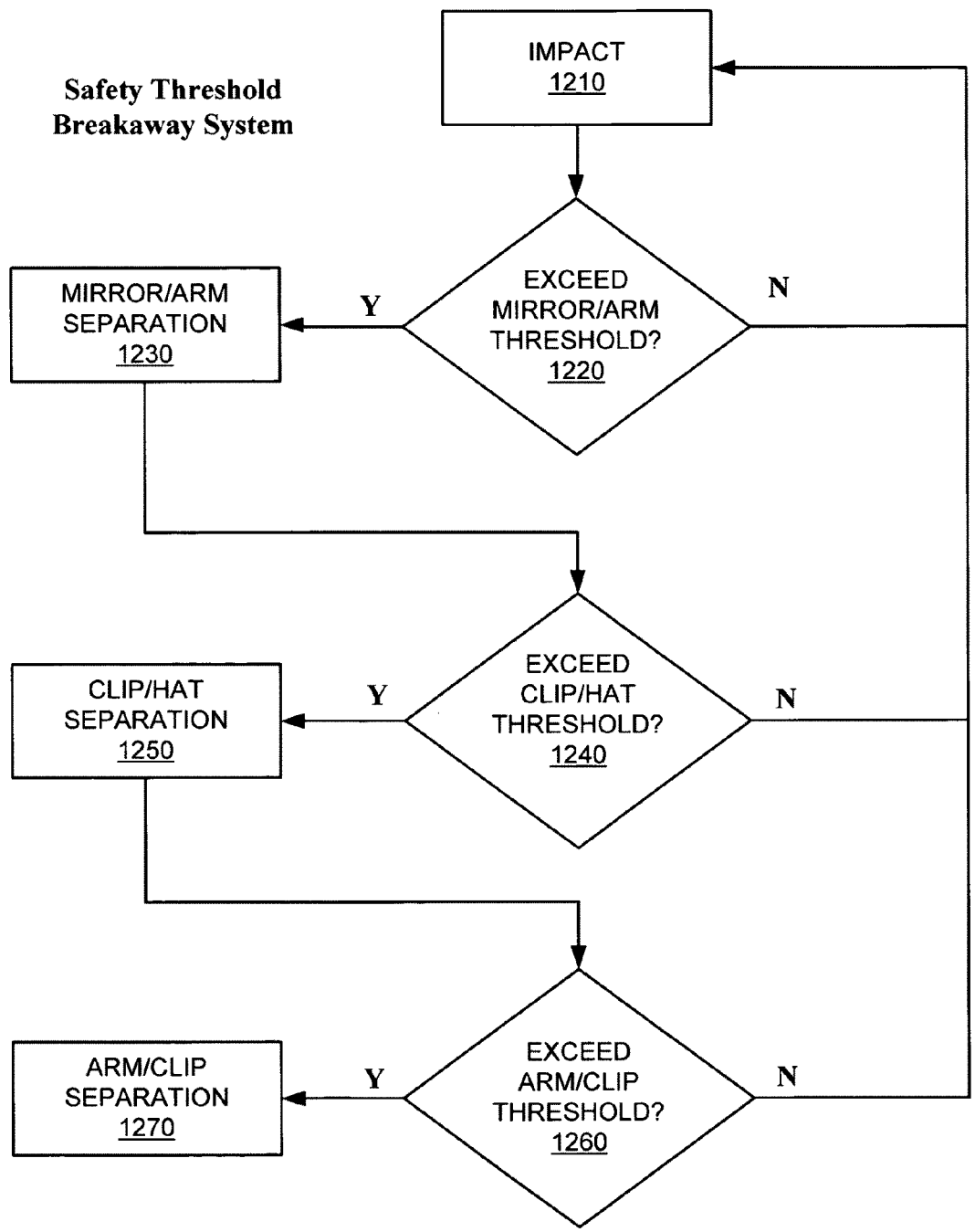
FIG. 12 is a flow diagram view of a portion of an alternate method of operation for a peripheral vision safety system in accordance with various embodiments of the present disclosure.

Turning now to FIGS. 10-12, systems and methods, in accordance with various embodiments, are described in terms with reference to flow diagrams. Describing a system and/or method by reference to a flow diagram enables one skilled in the art to develop a product, process, or procedure, including instructions and/or mechanical actions to carry out the systems and methods on suitably configured rear view safety devices. In various embodiments, portions of the operations to be performed by a rear view safety device may constitute structural features and/or operational instructions to protect the user.

Referring now to FIG. 10, a flow diagram view of a portion of a method of operation for adjustment of a rear view safety system is shown in further detail in accordance with various embodiments of the present disclosure.

Referring now to FIG. 11, a flow diagram view of a portion of a method of operation for a rear view safety system is shown in further detail in accordance with various embodiments of the present disclosure.

Referring now to FIG. 12, a flow diagram view of a portion of an alternate method of operation for a rear view safety system is shown in further detail in accordance with various embodiments of the present disclosure.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A peripheral vision safety device to be detachably secured to a headcovering, comprising:
    a reflective surface;
    an arm having a first connector and a second connector;
    an adjustable mounting bracket configured to securely hold the reflective surface, the mounting bracket having a third connector releasably connected to the second connector of the arm forming an adjustable first connection for removably securing said bracket to said arm; and
    a clip configured to detachably secure to an edge of the headcovering via a fifth connector, the clip having a fourth connector connected to the first connector of the arm forming an adjustable second connection for removably securing said clip to said arm, the second connection rotating radially perpendicular to a radial rotation of the first connection.

2. The peripheral vision safety device as recited in claim 1, wherein a separation threshold of the first connection is less than a separation threshold of the second connection.

3. The peripheral vision safety device as recited in claim 2, wherein the separation threshold of the first connection is less than about 0.17 ft-lb and the separation threshold of the second connection is more than about 32 ft-lb.

4. The peripheral vision safety device as recited in claim 1, wherein the reflective surface is a shatterproof safety mirror, the mirror configured to at least optically indicate motion.

5. The peripheral vision safety device as recited in claim 1, wherein the rotational axis of the first connection and the second connection are perpendicular.

6. The peripheral vision safety device as recited in claim 1, wherein the second connection is configured to rotating in a radial direction and the first connection swivels about the connection point between the third connector and the second connector.

7. The peripheral vision safety device as recited in claim 6, wherein the first connection between the second connector of the arm and the third connector of the bracket is a ball and socket joint configured to frictionally swivel for substantially universal adjustment of the reflective surface.

8. The peripheral vision safety device as recited in claim 6, wherein the second connection connecting the first connector and the fourth connector includes a hinge coupling to detachably secure the clip relative to the arm in a selectively fixed position.

9. The peripheral vision safety device as recited in claim 8, wherein the hinge coupling includes dual ratcheting sockets, at least one side of the hinge coupling exhibiting radial triangular corrugation and the other side of the hinge coupling having at least one matching radial triangular notch configured to match the radial triangular corrugation.

10. The peripheral vision safety device as recited in claim 8, wherein the adjustment includes a range from about 0 degrees to about 270 degrees.

11. The peripheral vision safety device as recited in claim 1, wherein the fifth connector includes a mouth configured to receive the edge of the headcovering and a manual toggle lever configured to securely clamp the clip to the edge of the headcovering.

12. The peripheral vision safety device as recited in claim 11, wherein the edge of the headcovering includes a brim and a bead around the circumference of the brim and the manual toggle lever of the fifth connector having a closed position and an open position, the closed position clamping the lever onto the brim of the headcovering trapping the thicker bead within the mouth of the clip.

13. A reflective peripheral vision safety system, comprising:
    a headcovering having an edge including either a substantially vertical crown portion or a substantially horizontal brim portion with a bead around the circumference of the brim; and at least one adjustably positioned reflective peripheral vision safety device configured to detachably secure to either a right or a left edge of the headcovering, each adjustably positioned reflective peripheral vision safety device having a reflective surface coupled to an adjustable mounting bracket, the adjustable mounting bracket releasably adjustably coupled to a rigid support arm, and a clip releasably adjustably coupled to the arm and detachably securably coupled to the edge of the headcovering, wherein each coupling, upon impact, is independently releasable from the rigid support arm and/or detachable from the headcovering.

14. The reflective peripheral vision safety system as recited in claim 13, wherein the at least one adjustably positioned reflective peripheral vision safety device includes two reflective peripheral vision safety devices adjustably positioned on the right and left side of the headcovering and configured to enable a user wearing the headcovering to see directly behind them.

15. The reflective peripheral vision safety system as recited in claim 13, wherein the headcovering is a hard hat/helmet configured to protect a head of a user, the helmet shell having a midline ridge and a suspension web inside the helmet configured to spread weight of the helmet over the top of the head and to provide a safety distance cushion between a shell of the helmet and the head by lessening impact of blows to the shell of the helmet.

16. The reflective peripheral vision safety system as recited in claim 15, wherein the at least one adjustably positioned reflective peripheral vision safety device includes a storage position detachably securing the safety device to an interior surface of the shell of the helmet to prevent wearing the helmet without removal of the safety device.

17. The reflective peripheral vision safety system as recited in claim 13, wherein reflective surface is configured to indicate motion behind the headcovering.

18. A method of peripheral vision reflection, comprising:
detecting a sudden directional impact with at least one adjustably positioned reflective peripheral vision safety device, each safety device having a reflective surface coupled to an adjustable mounting bracket releasably coupled to a rigid support arm releasably coupled to a clip detachably coupled to an edge of a headcovering;
determining whether the impact exceeds a separation threshold of at least one of the releasably couplings and/or the detachably coupling; and
separating each of the at least one of the releasably couplings and/or the detachably coupling exceeded by the impact.

19. The peripheral vision reflection method as recited in claim 18, wherein said separation threshold for each coupling is less than about 0.23 Joules (N-m).

20. The peripheral vision reflection method as recited in claim 18, wherein the separation threshold of each coupling is directionally variable.

* * * * *